(No Model.)
F. ZAHN.
POT OR PITCHER.
No. 567,802. Patented Sept. 15, 1896.
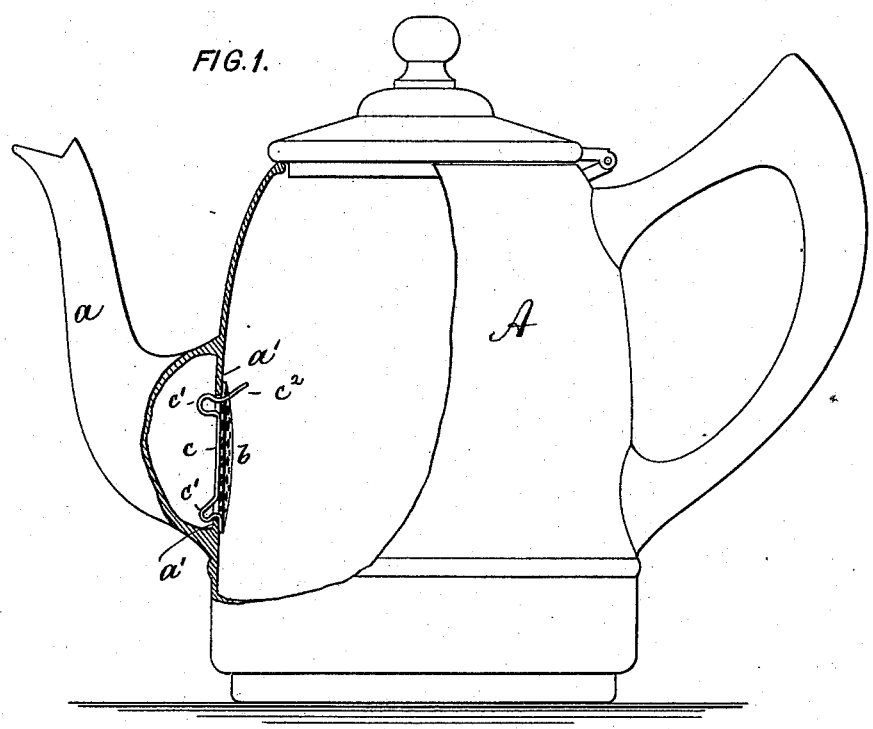
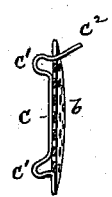
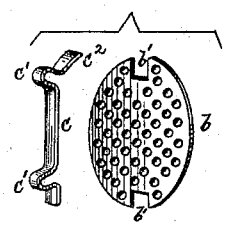
Witnesses:
John Becker.
William Schulz.
Inventor:
Franz Zahn
by his attorneys
Roeder & Briesen

UNITED STATES PATENT OFFICE.

FRANZ ZAHN, OF NEW YORK, N. Y.

POT OR PITCHER.

SPECIFICATION forming part of Letters Patent No. 567,802, dated September 15, 1896.

Application filed March 5, 1896. Serial No. 581,878. (No model.)

*To all whom it may concern:*

Be it known that I, FRANZ ZAHN, of New York city, New York, have invented an Improved Pot or Pitcher, of which the following is a specification.

This invention relates to a pot or pitcher which is so constructed that access to the interior of the spout may be readily had for the purpose of removing accumulated sediment. To this effect I secure a strainer of novel construction to a flange formed around the inner opening of the spout by means of a spring-catch in such a manner that the strainer may be readily attached or removed.

In the accompanying drawings, Figure 1 is an elevation, partly in section, of a coffee-pot embodying my invention. Fig. 2 is a longitudinal section through the strainer, and Fig. 3 a perspective view showing the two component parts of the strainer.

The letter A represents a pot or pitcher of suitable design and configuration, and provided with the discharge spout or nozzle $a$. Around the inner opening of this spout there is formed by the body of the vessel an inwardly-projecting flange $a'$, to which the strainer is adapted to be attached. This strainer consists of a perforated plate $b$, which is notched at diametrically opposite ends, as at $b'$. To the plate $b$ there is soldered a spring-arm $c$, that extends diametrically across the plate in line with the notches $b'$. This arm is provided with a pair of forwardly-bent catches or loops $c'$ and a rearwardly-bent finger-piece $c^2$, that passes to the rear of the plate $b$ through one of the notches $b'$. This notch, as well as the other notch, permits a free spring action of the looped sections of the arm $c$. In use the catches $c'$ are sprung over the flange $a'$ to securely affix the strainer to the inner opening of the spout $a$. By depressing the finger-piece $c^2$ the strainer may be readily detached or removed, when free access to the interior of the spout may be had.

It will be seen that my strainer is of simple construction and that it may be seated and removed in a quick and convenient manner.

What I claim is—

A vessel provided with a spout, and a flange $a'$, around the spout-opening, and wider above than below the opening, combined with a perforated plate having the notches $b'$ in opposite edges, and an arm $c$, secured to the plate, and provided with the bent elastic ends or loops $c'$, which extend through the notches in the plate, and engage with the flange $a'$; one of the ends or loops being provided with a handle $c^2$, substantially as shown.

FRANZ ZAHN.

Witnesses:
F. V. BRIESEN,
W. G. WHITING.